April 23, 1940.  J. R. CRAVATH  2,198,332
VEHICLE SEAT BACK
Filed Feb. 25, 1939   3 Sheets-Sheet 1
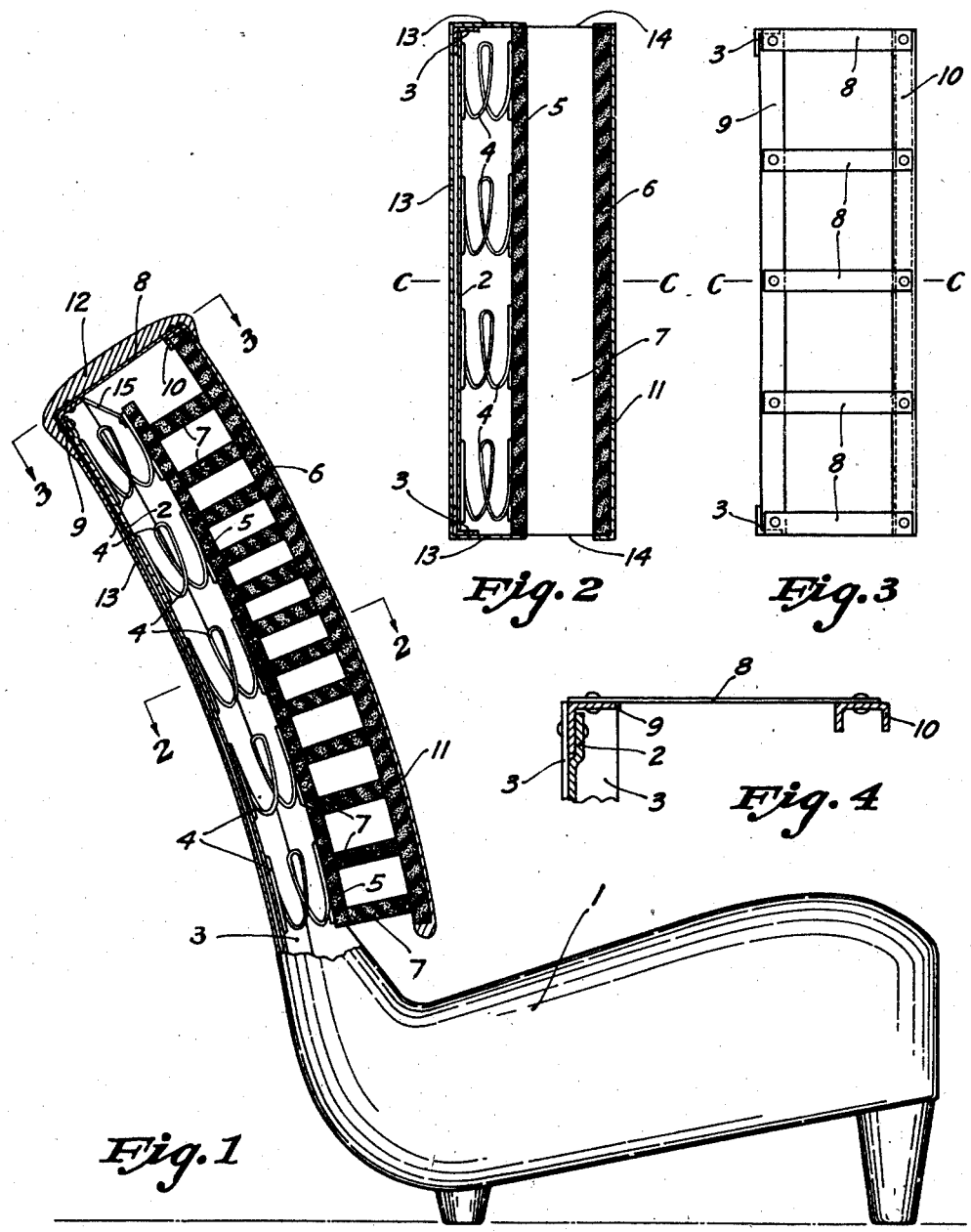
INVENTOR.
James R. Cravath April 23, 1940.                 J. R. CRAVATH                  2,198,332
                              VEHICLE SEAT BACK
                            Filed Feb. 25, 1939            3 Sheets-Sheet 2
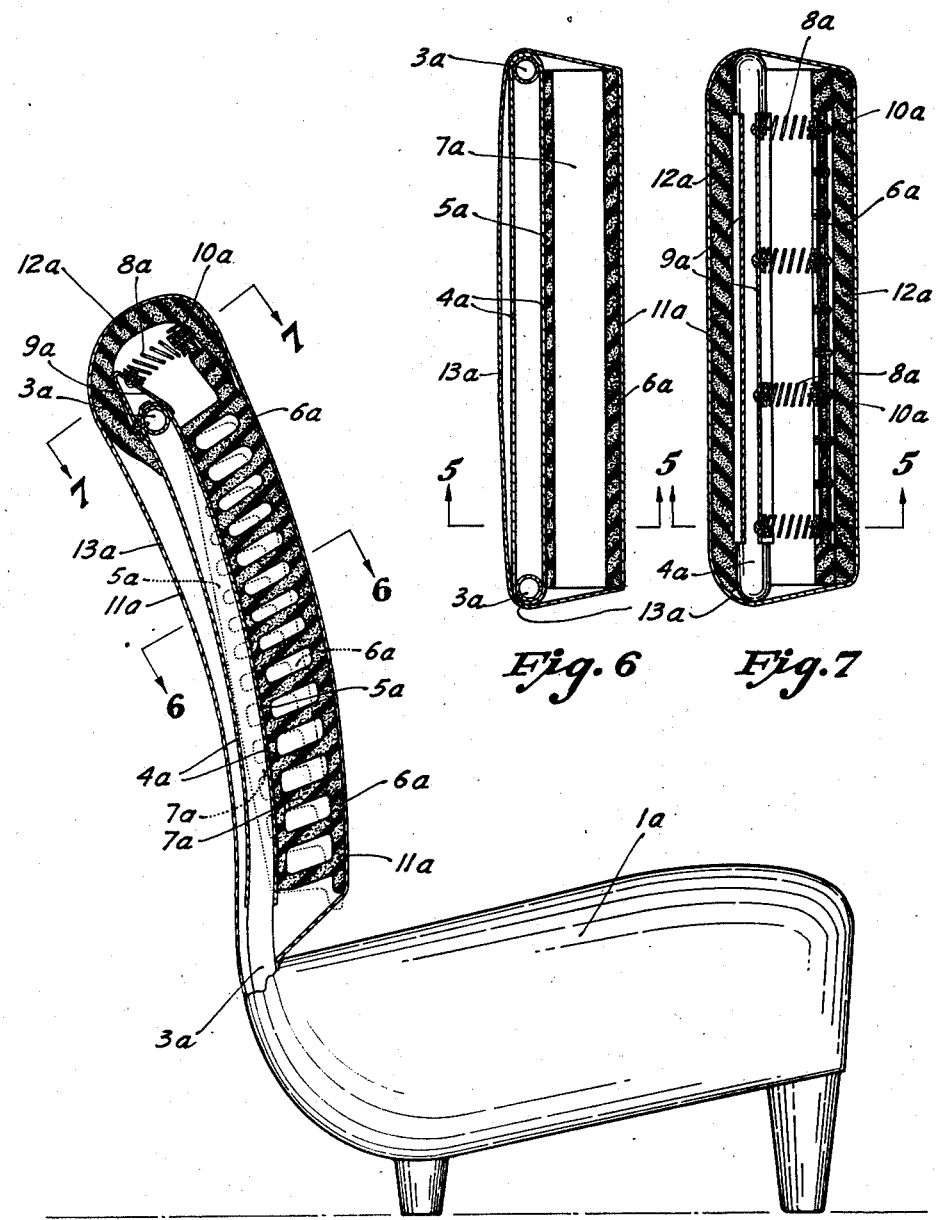
INVENTOR.
James R. Cravath

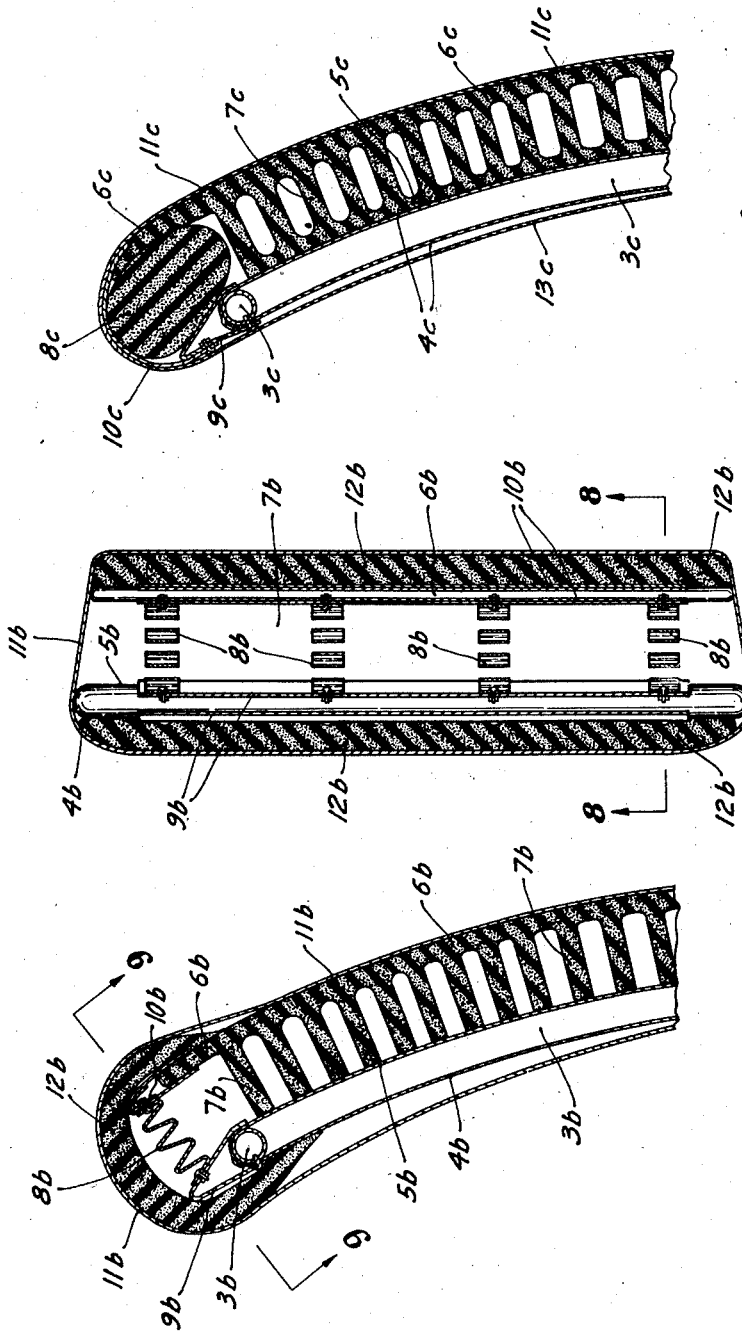

Patented Apr. 23, 1940

2,198,332

UNITED STATES PATENT OFFICE 2,198,332

VEHICLE SEAT BACK

James R. Cravath, Rock Island, Ill.

Application February 25, 1939, Serial No. 258,452

8 Claims. (Cl. 155—179)

My invention relates to vehicle seat backs of the synchronous type in which the front portion of the seat back which is next to the back of the passenger moves up and down in synchronism with the up and down movement of the body of the passenger when the passenger is riding on the usual springy seat cushion. A seat back which properly permits this synchronous movement as the one herein described eliminates the uncomfortable rubbing of the back of the passenger when there is up and down movement of the vehicle. This rubbing action is probably the major source of discomfort in the best made vehicle seats in common use at the present time. By this rubbing action the back of the passenger is in effect made to act as a snubber for the springs of the seat cushion. The object of my invention is to eliminate or greatly reduce this unpleasant rubbing effect by permitting relatively free up and down movement of the seat back cushion next to the back of the passenger without permitting a correspondingly free sideways movement which might be sufficient to make the back rest seem unpleasantly unstable and insecure and to accomplish this with a minimum of costly material and assembly labor. Other objects will be apparent in the course of the description.

This application for patent is in part a continuation of my application for patent, Serial Number 148,683, filed June 17, 1937, entitled Vehicle seat back.

The various features of my invention are illustrated by way of example in the accompanying drawings, in which:

Figure 1 is a side view of a vehicle seat embodying one form of my invention. The seat back is shown in section on the lines C C of Figures 2 and 3.

Figure 2 is a section on line 2 2 of Figure 1.

Figure 3 is a section on line 3 3 of Figure 1, with the covering cushion 12 omitted.

Figure 4 is an enlarged side view of some of the parts of the upper part of the seat back as shown in Figure 1.

Figure 5 is a side view of a vehicle seat embodying another form of my invention, the seat back being shown in section on lines 5 5 of Figures 6 and 7.

Figure 6 is a section on line 6 6 of Figure 5.

Figure 7 is a section on line 7 7 of Figure 5.

Figure 8 is a section of the upper part of a seat back on line 8 8 of Figure 9, showing other forms of certain features of my invention.

Figure 9 is a section on line 9 9 of Figure 8.

Figure 10 is a section of the upper part of a seat back showing another form of my invention, the section corresponding in position to line 8 8 of Figure 9.

In all of the figures the parts of corresponding function bear the same number. The letters following the numbers apply to the different figures and forms of the invention.

In Figure 1 a seat back support of any common suitable material and design may be used, such as a sheet of supporting material 2 fastened to angle iron frame pieces 3 which connect with a suitable supporting structure under the seat cushion 1. By 2 is supported a nest of helical springs 4 which are tied together by any of various suitable means known in the upholstery art and to the top member of the supporting frame by cords or wires 15. In front of and fastened to the spring cushion which is formed by springs 4 is another cushion or pad of a soft elastic material such as sponge rubber or any other material of similar physical characteristics. The type of sponge rubber known as latex foam is particularly well suited to this purpose.

This cushion which is an essential part of my invention, comprises a rear portion 5 attached to the spring cushion springs 4 for support, a front portion 6 next to the back of the passenger, and walls 7 joining the rear portion 5 to the front portion 6 at intervals. The vertical section of the cushion thus formed as shown in Figure 1 is substantially the same as any other vertical section taken in a plane parallel to that shown in Figure 1. In other words the cushion is substantially uniform in cross section. The walls 7 and the open spaces between them extend straight through the cushion from right to left, substantially horizontally and substantially uninterruptedly. The cushion then constiutes a structure with maximum horizontal bracing and minimum vertical bracing, thus providing a maximum resistance to the undesirable sideways movement of the passenger, (freedom of sideways motion being undesirable because it causes a feeling of instability) and a minimum resistance to the desirable freedom of up and down movement of the front portion 6 of the cushion. Of course these characteristics of this kind of a cushion as just described must be obtained along with certain other necessary or desirable characteristics, among which are the following. The cushion must be pleasantly soft. The walls 7 must be so spaced that there is no annoying corrugated effect on the front portion 6. The walls 7 must not be spaced so frequently that they make the cushion unpleasantly hard or that they rub against each other to any considerable extent when deflected by the pressure of the back of the passenger. I have found that a combination of these desirable qualities is best obtained when the openings or cavities extending through the cushion have greater dimensions as measured horizontally from front to rear than as measured vertically from wall to wall, as shown in Figure 1.

The cushion may be made as shown in the drawings of a width for one passenger, or it may be of a width less than required for one passenger or of a width for two or more passengers. But since, other conditions being equal, the freedom of up and down movement is greater the narrower the cushion, the cushions wider than for one passenger will have more of the undesirable resistance to up and down movement than the one-passenger cushions. This is because of the restraining effect of the adjoining cushion, taken together with the restraining effect of the adjoining anti-sag springs later described.

Cushions of this described construction may be placed side by side and cast, cemented or otherwise fastened together edge to edge. In such a case the completed assembly would consist of two or more cushions of my description combined to form a unit of the desired width. In such an assembly it may be convenient or expedient to have a staggered arrangement of the walls and cavities so that the walls do not come opposite each other at the places where the different cushions join each other at their edges. Such a staggering of the walls would not change the basic principles of the construction of this part of my invention as there would still be the absence of bracing against freedom of up and down movement and the bracing against sideways movement that is the essential feature of this type of cushion of my invention. The front and rear portions and walls of such a cushion may be either cemented or cast together, as expedient.

If sponge rubber is the soft elastic material used in my cushion construction and if the cushion is made agreeably soft, that is with the parts 6 and 7 thin enough to give maximum comfort, and a minimum weight and cost of the sponge rubber material, the cushion will collapse downwardly with the pressure of the back of the passenger if the front portion 6 is unsupported. The expression, collapse downwardly, as herein used, describes the condition in which the front portion 6 of the cushion moves downwardly and rearwardly and the walls tip downwardly away from planes normal to the front surface of the cushion to their limits of travel or until the parts 5, 6 and 7 are brought together in a compressed mass. Such collapsing, either downwardly or upwardly, is undesirable as it destroys the softness of the cushion and the freedom of up and down movement of the front portion 6 of the cushion. It is desirable that when the seat is occupied by a passenger and the vehicle is at rest the walls 7 be approximately normal or at right angles to the front surface of the cushion except for such curvature of the walls as may result from the pressure of the back of the passenger. In other words, under the desired condition the walls do not all collapse with a simultaneous upward or downward movement with the pressure of the back of the passenger but respond to this pressure by a kind of bulging or curvature up or down of their middle portions between the front and rear edges of the walls, leaving the front and rear edges of the walls approximately in the same plane. The collapse downwardly is due to the downward component of the pressure of the back of the passenger. The backward tilt required in comfortable seat backs causes a small part of the weight of the passenger to be carried by the seat back. Another factor contributing to the collapse downwardly is the weight of the front portion of the cushion which causes it to sag of its own weight, especially when the walls are made as thin and light as is desirable for comfort.

To compensate for these forces which cause collapse downwardly I introduce in certain various forms of my invention an independent springy or elastic support separately from the cushion itself to exert an upward force on the front portion 6 of the cushion.

In the form of my invention shown in Figures 1, 2, 3, and 4, such support is given by flat leaf springs which will not deform with age and which will retain their elasticity. For convenience hereinafter I will usually call these anti-sag springs. These flat anti-sag springs are supported by the metal angle strip 9, which in turn is supported by the upper ends of the angle iron frame pieces 3. The springs 8 are attached at their forward ends to a channel shaped strip of some stiff material 10 which is fastened to the upper edge of the front portion 6 of the cushion by any suitable means, such as cementing, taping or clamping. The parts are so assembled that the front ends of the springs are deflected down to exert an upward force on the front of the cushion 6 which is sufficient to prevent the cushion from sagging enough to collapse downwardly but not enough to cause it to collapse upwardly; this adjustment being made with the cushion loaded as by the occupancy of a passenger. I find that in the practical application of this invention there is a considerable range of adjustment for this anti-sag spring tension, within which range it will give the desired results as described with all ordinary weights of passengers.

The front of 6 may be covered with upholstery cloth 11. Over the top to cover the springs is padded upholstery 12. The spring cushion 4 is covered by the upholstery cloth 13. The ends of walls 7 and openings between them at points 14 are shown left open but they may be covered with loose upholstery cloth.

The pad parts 5, 6 and 7 may be cast in a mold in one piece or may be of separate pieces cemented or otherwise fastened together as may best meet the requirements of economical manufacture.

The spring cushion formed by springs 4 together with the cushion formed of 5, 6 and 7, act together to prevent unpleasant shocks reaching the back of the passenger when the vehicle teeters or gallops so that there is a fore and aft motion of the seat back. While I show a cushion of helical springs in the rear and the cushion 5, 6 and 7 in front, a reversed arrangement could be used without departing from the essential features of my invention. Also if desired the cushion 5, 6 and 7 may be used alone without the spring cushion.

In the form of my invention shown in Figures 5, 6 and 7 any common form of seat cushion 1a is used. The seat back support is a tubular metal frame 3a. Over this tubular metal frame is stretched elastic rubberized fabric 4a as heretofore used in certain seat back constructions. This elastic fabric serves as a cushion support which of itself furnishes a desirable springiness against fore and aft motion of the seat back. The cushion of my invention, comprising parts 5a, 6a, and 7a, like 5, 6, and 7 of Figure 1, already described, is cemented or otherwise suitably fastened to the front surface of the front layer of elestic fabric 4a. In this form of my invention the anti-sag springs which furnish the springy upward force on the front portion 6a of the cushion are helical springs 8a, mounted so that the upward force is exerted transversely to the axes of compression or extension of the springs. These springs 8a are firmly fastened to a metal trough 9a which in turn is fastened to the top member of the tubular supporting frame 3a. The forward ends of the springs 8a are firmly fastened to the clamp 10a which clamps over the top edge of the front portion of the cushion 6a. The force exerted upwardly by the springs is thus transmitted by means of the clamp to the front portion of the cushion. The cushion is so placed that the front ends of the springs are deflected downwardly, thus exerting an upward force on the front of the cushion. To cover the springs and other top members and to furnish a base for upholstery cloth 11a, a pad of sponge rubber or other soft cushioning material 12a is placed over the top of the seat back. Although I show a plurality of anti-sag springs one spring might be used.
In the form of my invention shown in Figures 8 and 9 the cushion support is elastic rubberized fabric as in Figures 5, 6, and 7, but the front layer of this elastic fabric 5b also forms the rear portion of the cushion as the walls 7b in the cushion are cemented or otherwise fastened to the elastic fabric 5b. The front layer of the elastic fabric 5b and the rear layer of the elastic fabric 4b are stretched over the steel tube frame 3b in the form of an envelope as in Figure 5.
The parts 5b, 6b and 7b of the cushion, all being of elastic material function as do the parts 5, 6 and 7 of Figure 1, previously described. The elastic fabric 4b and 5b of Figure 8 functions as does 4a of Figure 5. The anti-sag springs 8b in Figures 8 and 9 are flat metal strips bent into zig-zag form. They are suitably attached to a rigid U-shaped strip 10b which is in turn attached to the top edge of the front portion 6b of the cushion by strips of adhesive tape or fabric passed over 10b and cemented to 6b.

It will be noted that in the forms of my invention shown in Figures 5 to 9 inclusive I use anti-sag springs which may be described by the general term convoluted. Convolutions, bends or turns are made in these springs for the purpose of securing greater length of spring within a given space. Such convoluted springs may be of various shapes and forms without departing from the basic idea. One example is shown in Figure 5 where helical coiled springs are used and another example in Figure 8 where zig-zag strip springs are used. All of these springs in Figures 5 and 8 exert their upward force on the front of the cushion in directions transverse to their directions of compression. Taking up now the reasons for the use of convoluted springs in the places and manner herein disclosed, it is to be pointed out that in order to keep the cost of the elastic cushion material, such as latex foam, as low as desirable it is in many cases important to make the cushion as thin as will function properly. A thin cushion, especially if mounted on a thin springy elastic fabric support as in Figures 5 to 10 inclusive, results in a thin seat back in which there is not the fore and aft room for anti-sag springs that there is in such a construction as shown in Figures 1 to 4 for example. If such anti-sag springs are of the flat leaf type they must be very short. To meet the requirements as to necessary upward force to be exerted together with a sufficient ease of up and down movement, I have found that if a few thick flat leaf springs are used so that the cost of springs and the cost of labor for mounting and assembling them is low, the elastic limit of such short thick springs is likely to be exceeded by certain strains to which the springs may be subjected in service, as when a passenger leans heavily on the top of a seat back. The springs may be thus bent or broken. This danger of bending or breakage can be prevented by stops to limit the downward movement of the forward ends of the springs, but it is desirable to obviate this complication. If this difficulty is overcome by using a larger number of thinner leaf springs the elastic limits will not be exceeded within the amount of spring movement required but the cost of springs and assembly labor is unduly high. The convoluted type of spring makes possible a greater length of spring in the space available and by virtue of the greater spring length so obtained a few inexpensive heavy springs can be used and limit stops on the one hand are obviated and on the other hand a large number of thin leaf springs are not necessary. Convoluted springs when used as here described also have the desirable quality of providing a cushioning effect for accidental impacts of the passenger against the top of the seat back, thus supplementing the padding 12a and 12b. In addition to the foregoing advantages, the convoluted type of spring, as exemplified by 8a and 8b, when mounted as shown, to the number of two or more, fastened at their ends rigidly to the clamp strip 10a and 10b, has the further desirable quality of offering much more resistance to sideways deflection than to up and down deflection, but at the same time not being unpleasantly rigid to sideways deflection. The leaf springs are rigid to sideways deflection. Considerable springy resistance to sideways deflection is desirable to aid the cushion in preventing sideways instability or roll of the front portion of the seat back cushion. I do not wish to be limited to the forms of convoluted springs shown here as examples. Securing the desirable length of spring by convolutions consisting of turns or bends may be accomplished in a variety of forms, all of which would come under the term convoluted in the sense in which I use it herein.

In Figure 10 I show another form of my invention in which the elastic support exerting an upward force on the front portion of the cushion is furnished by a mass of elastic material such as latex foam. In Figure 10 the tubular steel frame 3c supports the seat back and the elastic rubberized fabric 4c is stretched as an envelope over this frame. The cushion which consists of parts 5c, 6c and 7c, as in Figures 1 and 5 previously described, is fastened to the rubberized elastic fabric 4c. Resting against the metal trough 9c is a mass of latex foam 8c extending across the top of the back cushion, over which mass a strong cloth or fabric is fastened at its rear edge to the trough 9c and at its forward edge to the front portion 6c of the latex foam cushion. This fabric 10c is stretched over the elastic mass 8c tightly enough to compress the mass 8c and thus exert the necessary upward force on 6c. The seat back is enclosed as usual with the upholstery cloth 11c and 13c.

In Figure 1 the walls 7 are shown extending approximately horizontally in planes approximately normal to the front surface of the cushion with no passenger in the seat. That is the seat back is not loaded. While such a construction will produce the results stated as the objects of the invention in affording a relatively free up and down movement, a greater refinement is possible. I find that a less weight of latex foam and a softer and more agreeable feeling cushion will result if the cushion is so constructed that the walls are normal or at right angles to the front surface of the cushion, to the nearest practicable approximation, when the cushion is loaded. There is a flattening out or reduction of curvature of the seat back cushion, as measured in vertical planes normal to the front surface of the cushion, when the cushion is loaded as compared to the condition when the cushion is not loaded. This is on the assumption that the usual practice is followed of curving the back cushion to make it approximately fit the back of a passenger. The character of this flattening out differs with various cushion supports. The general shape of the contour when loaded is more flattened with an elastic fabric type of support than with a spring cushion support back of my cushion. The effect of this flattening out of the cushion support with the load is to change the angles which the walls 7 make with the surfaces of the front and rear portions 5 and 6 of the cushion. If the walls are normal to the curvature of the front of the cushion when the cushion is not loaded the flattening out of the cushion when it is loaded will cause the walls in the upper and lower portions of the cushion to incline away from normal and the wall material will not be used to best advantage to sustain the pressure of the back of the passenger. Consequently unnecessary material must be used in the walls to sustain a given load. To remedy this condition I determine to the nearest approximation practicable what the curvature or contour of the rear surface of the latex foam cushion will be in vertical planes when loaded with the average passenger when the cushion is mounted on the same kind of springy cushion support that is to be used behind the cushion. I then make the cushion of a shape to fit the loaded curvature thus determined, with the walls as nearly normal to the front of the loaded cushion as practicable. The walls are then in the best position to sustain the pressure or load of the back of the passenger and can be made of minimum thickness. When this is done the walls of the cushion when the cushion is unloaded will not all be in planes normal to the front of the cushion but will incline away from the normal in the upper and lower portions of the cushion, before the upward lift of the anti-sag springs or other elastic means is applied. In Figure 5 the positions of the walls 7a are shown for the unloaded cushion by the solid lines and their positions when the cushion is loaded are shown by the dotted lines. These are shown in an approximate and diagrammatic manner however to illustrate the principle without attempting to show the exact conditions which will of course vary with different passengers and with different types of cushion support, nor do I attempt in Figure 8 to show the relative positions of the anti-sag springs with the loaded and unloaded cushion, nor the deflections of individual walls under the pressure of the passenger. These deflections vary from point to point in the cushion. When the anti-sag springs are adjusted to prevent either downward or upward collapse of the cushion as hereinbefore specified these springs will exert enough upward force to pull the front portion of the cushion up so that the walls of the unloaded cushion will slant upwardly from rear to front, especially in the upper part of the cushion. When the cushion is loaded these walls take a position more nearly normal to the front and rear surfaces of the cushion. When the cushion is made to the best condition of curvature as herein described and the adjustment of the upward lift of the anti-sag springs is made as specified, the conditions are favorable both for minimum cost and thickness of walls 7a and also for a desirable softness of cushion because by keeping the loaded walls as nearly as possible normal to the front of the cushion they are structurally in the best position to sustain the backward pressure of the back of the passenger so that they can be of minimum thickness and cost and this minimum thickness also permits an agreeable softness in the cushion.

In Figures 1 and 5 it will be noted that I have the walls 7 and 7a spaced at shorter distances at the level of the shoulder blades of the average passenger than above or below that level. The intervals between the walls are progressively increased to the lower edge of the cushion, the wall thickness being the same throughout. This makes the cushion softer in its lower part, which in the type of cushion of my invention I find gives a more agreeable effect than if the cushion were of uniform softness throughout. A somewhat similar result can be obtained by making the walls progressively thinner above and below the shoulder blade level.

I wish it understood that all of the drawings herewith are made somewhat diagrammatic for the sake of simplicity and clearness and in this connection I wish it to be particularly noted that in Figures 1, 8, and 10 the positions of the walls 7 are diagrammatic in that they are shown in planes normal to the front surface of the cushion 6 with no passenger on the seat and that the practical conditions with no passenger in the seat are more nearly as the solid lines in Figure 5. Since the desirable condition is to have the walls 7 as nearly as possible normal to the front when the greatest load or pressure is on the cushion, the anti-sag spring tension must be such as to pull the front of the cushion above the position in which the walls are normal to the front when the seat back is not loaded.

While I have herein shown and described several embodiments of my invention it is to be understood that I desire only such limitations to be imposed thereupon as are set forth in the appended claims.

I claim:

1. In a vehicle seat back, a pad forming one layer of the seat back with a front portion of the pad nearest to the passenger and a rear portion of the pad farthest from the passenger, the pad consisting of a mass of soft, elastic, sponge-rubber-like material having openings of oblong cross section in and laterally surrounded by the mass, the cross sections being taken in vertical planes normal to the front surface of the pad, the openings extending approximately horizontally and also approximately parallel to the surface of the front portion of the pad, the long dimensions of the oblong cross sections of the openings coinciding approximately with lines normal to the front surface of the pad, and a seat back supporting structure to which the rear portion of the pad is attached, the front portion of the pad being approximately unobstructed for up and down movement.

2. In a vehicle seat back, a cushion, the front portion of the cushion being of a soft and elastic material and next to the back of the passenger, the rear portion of the cushion being of an elastic material and attached to the seat back supporting structure, the rear surface of the cushion being approximately parallel to the front surface of the cushion, walls of a soft and elastic material joining the front and rear portions at intervals and extending approximately horizontally from right to left in the cushion in planes approximately normal to the front surface of the cushion, the cavities thus formed extending from right to left, substantially uninterruptedly through the cushion and being of greater dimensions horizontally from front to rear than vertically from wall to wall, and separate resilient supporting means exerting an upward force on the front portion and preventing downward collapse of the cushion.

3. In a vehicle seat back, a cushion, the front portion of the cushion being of a soft and elastic material and next to the back of the passenger, the rear portion of the cushion being of an elastic material and attached to the seat back supporting structure, walls of a soft and elastic material joining the front and rear portions at intervals, said walls extending approximately horizontally from right to left in the cushion in planes approximately normal to the surface of the front of the cushion, the cavities thus formed extending from right to left, substantially uninterruptedly through the cushion, and being of greater dimensions horizontally from front to rear than vertically from wall to wall, and an elastic mass of material extending from right to left along and above the top edge of the cushion, the mass resting at its rear against the seat back supporting structure, a fabric-like sheet of flexible material extending over the top of the elastic mass, the sheet being attached at its rear to the seat back supporting structure and at its front to the front portion of the cushion, the elastic mass being compressed under the sheet so that an upward force is exerted on the front portion of the cushion.

4. In a vehicle seat back, a cushion, the front portion of the cushion being of a soft and elastic material and next to the back of the passenger, the rear portion of the cushion being of an elastic material and attached to the seat back supporting structure, walls of a soft and elastic material joining the front and rear portions at intervals, said walls extending approximately horizontally from right to left in the cushion in planes approximately normal to the surface of the front of the cushion, the cavities thus formed extending from right to left, substantially uninterruptedly through the cushion and being of greater dimensions horizontally from front to rear than vertically from wall to wall, and springs exerting an upward force on the front portion of the cushion, each such spring being attached at one end to the seat back supporting structure and at the other end to the front portion of the cushion.

5. In a vehicle seat back, a cushion, the front portion of the cushion being of a soft and elastic material and nearest to the back of the passenger, the rear portion of the cushion being of a flexible material and farthest from the back of the passenger, walls of a soft and elastic material joining the front and rear portions at intervals and extending approximately horizontally from right to left in the cushion in planes approximately normal to the front surface of the cushion, the cavities thus formed extending from right to left, substantially uninterruptedly, through the cushion and being of greater dimensions horizontally from front to rear than vertically from wall to wall, resilient supporting means exerting an upward force on the front portion and preventing downward collapse of the cushion, and a resilient cushioning member flatways of the rear portion of the cushion, said member being supported by the seat back supporting structure and attached at its front surface to the rear portion of the cushion, and being resilient to fore and aft motion of the body of the passenger.

6. In a vehicle seat back, a pad forming one layer of the seat back with a front portion of the pad nearest to the passenger and a rear portion of the pad farthest from the passenger, the pad consisting of a mass of soft, elastic, sponge-rubber-like material having openings of oblong cross section in and laterally surrounded by the mass, the cross sections being taken in vertical planes normal to the front surface of the pad, the openings extending approximately horizontally and also approximately parallel to the surface of the front portion of the pad, the long dimensions of the oblong cross sections of the openings coinciding approximately with lines normal to the front surface of the pad, and a spring cushion assembly attached flatwise to the pad, the pad and the spring cushion assembly being fastened to a seat back supporting structure, and the front portion of the pad being approximately unobstructed for up and down movement.

7. A vehicle seat back having in its front portion nearest to the passenger a first sheet-like mass of sponge-rubber-like material, a second sheet-like mass of sponge-rubber-like material located in the rear of the first mass and approximately parallel with it, sheet-like strips of sponge-rubber-like material spaced at intervals between the first mass and the second mass, the front and rear edges of the strips joining to the first and second masses respectively, the intersections of the edges of the strips with the first and second masses extending approximately horizontally and the exposed sides of the strips being approximately normal to the front surface of the first mass, a seat back supporting structure to which the second sheet-like mass is attached, and anti-sag springs of metal, each spring being at one end attached to and supported by the supporting structure and at the other end attached to the upper edge of the first mass, the spings being under tension to prevent sagging of the first mass and attached strips.

8. A vehicle seat back having in its front portion nearest to the passenger a first sheet-like mass of sponge-rubber-like material, a second sheet-like mass of sponge-rubber-like material located in the rear of the first mass and approximately parallel with it, sheet-like strips of sponge-rubber-like material spaced at intervals between the first mass and the second mass, the front and rear edges of the strips joining to the first and second masses respectively, the intersections of the edges of the strips with the first and second masses extending approximately horizontally and the exposed sides of the strips being approximately normal to the front surface of the first mass, a spring cushion assembly attached flatways to the rear of the second mass, a seat back supporting structure attached flatways to the rear of the spring cushion assembly, and anti-sag springs of metal, each spring being at one end attached to and supported by the supporting structure and at the other end attached to the upper edge of the first mass, the springs being under tension to prevent sagging of the first mass and the attached strips.

JAMES R. CRAVATH.